United States Patent Office 3,527,775
Patented Sept. 8, 1970

3,527,775
TRICYCLOHEXYLTIN NITRATE AND AZIDE
Donald E. Bublitz, Concord, Calif., assignor to The Dow Chemical Company, Midland, Mich., a corporation of Delaware
No Drawing. Filed Sept. 20, 1968, Ser. No. 761,311
Int. Cl. C07c 117/00; C07f 7/22
U.S. Cl. 260—349
3 Claims

ABSTRACT OF THE DISCLOSURE

The novel compounds tricyclohexyltin nitrate and tricyclohexyltin azide, said compounds being useful as pesticides.

---

The present invention relates to the novel and useful compounds tricyclohexyltin nitrate and tricyclohexyltin azide.

These compounds are crystalline solids at room temperature. They are useful as pesticides for the control of a wide variety of pests such as arachnid, fungal, plant, and insect organisms, for example, mites, ticks, the causative agents of bean mildew, pigweeds, bindweeds, worms, flies, beetles, and roaches. They are particularly useful as acaricides for the control of mites and ticks.

The compounds of the present invention are prepared by reacting together tricyclohexyltin chloride and silver nitrate or sodium azide.

The reaction with silver nitrate proceeds smoothly at temperatures of from about 0° C. to about 100° C. and conveniently at the boiling point of the reaction mixture and under reflux. The sodium azide reaction proceeds at similar temperatures and satisfactorily at room temperature. The reactions are conveniently conducted in inert anhydrous organic liquid reaction medium. Suitable media include acetronitrile, tetrahydrofuran, and so forth. In the sodium azide reaction, an aqueous ether medium is conveniently employed. The amounts of the reactants employed in either reaction are not critical, some of any of the desired products being formed when employing any proportions of reagents. However, the reactions consume the reagents in the proportion of one mole of tricyclohexyltin chloride per mole of silver nitrate and sodium azide and the employment of such proportions is usually preferred. Conveniently, the sodium azide can be used in relatively large excess without detriment to the reaction.

In conducting the reaction, the tricyclohexyltin chloride, silver nitrate or sodium azide, are contacted with one another in liquid reaction medium, if employed, in any convenient order or fashion. The reaction mixture is then maintained within the given temperature range for a period of time sufficient to complete the reaction. The reaction mixture is then conveniently processed to separate and isolate product. Such processing includes evaporation, filtration, crystallization, extraction, distillation, chromatography, and the like.

The following examples illustrate the present invention but are not to be construed as limiting.

EXAMPLE 1

Tricyclohexyltin nitrate

Silver nitrate (8.46 grams; 0.0439 mole) is dispersed in 500 milliliters of acetonitrile at room temperature. To the resultant dispersion is added, portionwise, 20.2 grams (0.0500 mole) of tricyclohexyltin chloride. This addition is conducted with stirring over a five minute period. Following this addition, the reaction mixture is heated to the boiling point and maintained under reflux for three hours. It is then cooled and filtered. The filtrate is separated and concentrated by evaporation to obtain the tricyclohexyltin nitrate product as a light yellow solid melting at from 149° to 150° C. Identification of the compound is provided by its infrared spectrum.

EXAMPLE 2

Tricyclohexyltin azide

Tricyclohexyltin chloride (2.0 grams; 0.0050 mole) is dispersed in 80 milliliters of diethyl ether at room temperature. To the resultant dispersion is added, with stirring, a solution of 3.0 grams (0.046 mole) of sodium azide in 12 milliliters of water. The resultant mixture is stirred at room temperature for five hours. The organic layer is then separated with a separatory funnel, dried over anhydrous sodium sulfate, and concentrated by evaporation to dryness at room temperature to obtain tricyclohexyltin azide as a white solid melting at from 104° to 105° C. The compound further is identified from its infrared spectrum which exhibited a characteristic in azide peak at 4.8 microns. The structure is further proved by mass spectral analysis.

The compounds of the present invention are useful as pesticides for the control of a wide variety of household and agricultural pests such as arachnid, fungal, plant and insect pests, for example, mites, ticks, Bacillus subtilis, pigweeds, Daphnia, worms, and flies, For such use, the unmodified compounds can be employed. Alternatively, the compounds can be dispersed in water with or without the aid of a wetting agent and the resulting aqueous dispersions employed as sprays. In other procedures, the compounds can be employed as a constituent in edible oils or in other oils or solvents, or as a constituent in solvent-in-water or water-in-solvent emulsions or dispersions which can be employed as sprays, drenches or washes. Good results are obtained with methods employing and compositions containing pesticidal amounts of one or more of the compounds hereof. Generally, these amounts range from about 0.5 to about 5000 parts per million of one or more of the compounds.

In representative operations, each of tricyclohexyltin nitrate and tricyclohexyltin azide gives complete controls and kills of two-spotted spider mites when the latter are separately contacted with compositions containing, as the sole toxicant, one of the named compounds at a concentration of 500 parts per million by weight.

In further representative operations, tricyclohexyltin azide gives substantially complete controls and kills of Staphylococcus aureus, when such is applied as the sole toxicant at concentrations of 500 parts per million by weight to the environment supporting such organism.

The starting compounds hereof are prepared via known methods. Tricyclohexyltin chloride can be prepared by the Grignard reaction of cyclohexylmagnesium halide and tin tetrachloride.

What is claimed is:
1. The compound tricyclohexyltin nitrate.
2. The compound tricyclohexyltin azide.
3. A tricyclohexyltin salt of the group consisting of tricyclohexyltin nitrate and tricyclohexyltin azide.

References Cited

UNITED STATES PATENTS 2,974,171   3/1961   Coffield _____ 260—429.7 XR
3,450,701   6/1969   Davies _____ 260—349 XR HENRY R. JILES, Primary Examiner J. M. FORD, Assistant Examiner U.S. Cl. X.R.
260—429.7, 999